(12) United States Patent
Funakoshi et al.

(10) Patent No.: US 7,456,876 B2
(45) Date of Patent: Nov. 25, 2008

(54) IMAGE PROCESSING CIRCUIT PROVIDING IMPROVED IMAGE QUALITY

(75) Inventors: Jun Funakoshi, Kawasaki (JP); Shigeru Nishio, Kawasaki (JP); Asao Kokubo, Kawasaki (JP); Masatoshi Kokubun, Aichi (JP)

(73) Assignee: Fujitsu Limited, Kawasaki (JP)

( * ) Notice: Subject to any disclaimer, the term of this patent is extended or adjusted under 35 U.S.C. 154(b) by 721 days.

(21) Appl. No.: 10/625,567

(22) Filed: Jul. 24, 2003

(65) Prior Publication Data

US 2004/0119854 A1 Jun. 24, 2004

(30) Foreign Application Priority Data

Jul. 25, 2002 (JP) ............................. 2002-216848
Oct. 31, 2002 (JP) ............................. 2002-317033

(51) Int. Cl.
*H04N 5/217* (2006.01)

(52) U.S. Cl. ................. 348/241; 348/243; 348/222.1

(58) Field of Classification Search ................ 348/241, 348/229.1, 242, 243, 248; 358/463
See application file for complete search history.

(56) References Cited

U.S. PATENT DOCUMENTS

| | | | | |
|---|---|---|---|---|
| 6,201,582 B1 * | 3/2001 | Hentschel | ................... | 348/607 |
| 6,433,822 B1 * | 8/2002 | Clark et al. | ................. | 348/241 |
| 6,747,264 B2 * | 6/2004 | Miida | ......................... | 348/300 |
| 6,831,686 B1 * | 12/2004 | Koren et al. | ................ | 348/241 |
| 6,844,896 B2 * | 1/2005 | Henderson et al. | .......... | 348/248 |
| 6,847,176 B2 * | 1/2005 | Kim | ...................... | 348/E5.077 |
| 2003/0016294 A1 * | 1/2003 | Chiu | .......................... | 348/241 |
| 2003/0202111 A1 * | 10/2003 | Park | ........................... | 348/280 |

FOREIGN PATENT DOCUMENTS

| | | |
|---|---|---|
| JP | 6-326929 A | 11/1994 |
| JP | 07-072256 A | 3/1995 |
| JP | 2001-025026 A | 1/2001 |
| JP | 2001-036816 | 2/2001 |
| JP | 2001-268441 A | 9/2001 |
| JP | 2002-010275 A | 1/2002 |
| JP | 2002-218324 | 8/2002 |

\* cited by examiner

*Primary Examiner*—Nhan T Tran
(74) *Attorney, Agent, or Firm*—Arent Fox LLP

(57) ABSTRACT

An image processing circuit for a color image sensor, comprising a color sensitivity correction circuit which adds/subtracts a predetermined offset to/from pixel signals being output by amplifying photoelectric conversion signals of pixels, which have photoelectric conversion element and are arranged in column and row directions, for each column, and multiplies the result by a predetermined gain, wherein the predetermined offset includes a first offset, which is set according to each color, and a second offset, which is set according to a plurality of columns. According to the present invention, the offset of the color sensitivity correction circuit includes a first offset, which is set according to each color, and a second offset, which is set according to a plurality of columns, therefore, periodic moiré in the vertical direction, which is caused by the column output circuit and the output signal supply circuit for each column, can be suppressed, and image quality can be improved.

6 Claims, 12 Drawing Sheets

RGRGRGRGRG
GBGBGBGBGB
RGRGRGRGRG
GBGBGBGBGB
RGRGRGRGRG
GBGBGBGBGB

Pin

Koff
Kgain

P=(Pin−Koff)×Kgain

FIG. 10A (A) PIXEL SIGNALS PIN OUTPUT FROM PIXELS
R11=31  G12=61 R13=33 G14=59
G21=60  B22=13 G23=62 B24=11
R31=31  G32=61 R33=33 G34=59
G41=60  B42=13 G43=62 B44=11

FIG. 10B (B) OFFSET FOR EACH COLUMN  C1=0  C2=1  C3=2  C4=-1
OFFSET FOR EACH FILTER COLOR  RO=1  GO=0  BO=2
GAIN FOR EACH COLOR  RG=2  GG=1  BG=6

FIG. 10C (C) FIRST LINE
column 1 R  $\{Pin-(C1+RO)\} \times RG = R11m$
column 2 G  $\{Pin-(C2+GO)\} \times GG = G12m$
column 3 R  $\{Pin-(C3+RO)\} \times RG = R13m$
column 4 G  $\{Pin-(C4+GO)\} \times GG = G14m$
SECOND LINE
column 1 G  $\{Pin-(C1+GO)\} \times GG = G21m$
column 2 B  $\{Pin-(C2+BO)\} \times BG = B22m$
column 3 G  $\{Pin-(C3+GO)\} \times GG = G23m$
column 4 B  $\{Pin-(C4+BO)\} \times BG = B24m$

FIG. 10D (D) CORRECTED PIXEL SIGNALS P
R11m=60 G12m=60 R13m=60 G14m=60
G21m=60 B22m=60 G23m=60 B24m=60
R31m=60 G32m=60 R33m=60 G34m=60
G41m=60 B42m=60 G43m=60 B44m=60

IMAGE PROCESSING CIRCUIT PROVIDING IMPROVED IMAGE QUALITY

CROSS-REFERENCE TO RELATED APPLICATIONS

This application is based upon and claims the benefit of priority from the prior Japanese Patent Applications No. 2002-216848, filed on Jul. 25, 2002 and No. 2002-317033, filed on Oct. 31, 2002, the entire contents of which are incorporated herein by reference.

BACKGROUND OF THE INVENTION

1. Field of the Invention

The present invention relates to an image processing circuit of a semiconductor image sensor, such as a CMOS image sensor and a CCD image sensor, and more particularly to an image processing circuit of an image sensor providing improved image quality by suppressing such noise as moiré that generates for each column.

2. Description of the Related Art

A CMOS image sensor, an example of a semiconductor image sensor, comprises a pixel array where pixels having photoelectric conversion elements, are arranged in a matrix, wherein a color filter, such as RGB, is disposed on the pixel array, and each pixel outputs a photoelectric conversion signal matching the gradation value of each RGB corresponding to the color filter. In the row direction of the pixel array, row select lines for selecting each pixel and reset lines for resetting the potential of each pixel are disposed, and in the column direction of the pixel array, column lines for propagating the photoelectric conversion signal of each pixel to the column output circuit are disposed. In the column lines, a column output circuit, which has such functions as amplifying the photoelectric conversion signal and removing the reset noise thereof, is disposed respectively, and the output signal of the column output circuit is supplied to the image processing circuit via the output bus.

The image processing circuit, which is also called a color processor, performs sensor sensitivity correction, color interpolation processing, color adjustment processing, gamma conversion processing, and output format conversion processing, and outputs image signals in the desired format.

Such a CMOS image sensor is disclosed in prior art, stated in Japanese Patent Laid-Open No. 2002-218324.

In the image sensor, the column output circuit is disposed for each column, and a pixel signal, which is an output signal of the column output circuit, is supplied to the color processor via a common output bus. Each column output circuit and the circuit for supplying pixel signals from the column output circuit to the color processor are in a parallel configuration, and are designed such that characteristics do not disperse depending on the column.

However, if an image is displayed or output by the image signals generated from the image sensor, vertical moiré is generated regularly or irregularly in the output image. When images with uniform color are output, in particular, such vertical stripe patterns may stand out.

SUMMARY OF THE INVENTION

With the foregoing in view, it is an object of the present invention to provide an image sensor which can suppress the generation of moiré in the vertical direction in the output image.

To achieve the above object, one aspect of the present invention is an image processing circuit for a color image sensor, comprising a color sensitivity correction circuit which adds/subtracts a predetermined offset to/from pixel signals being output by amplifying photoelectric conversion signals of pixels, which have photoelectric conversion element and are arranged in column and row directions, for each column, and multiplies the result by a predetermined gain, wherein the predetermined offset includes a first offset, which is set according to each color, and a second offset, which is set according to a plurality of columns.

According to this aspect of the present invention, the offset of the color sensitivity correction circuit includes a first offset, which is set according to each color, and a second offset, which is set according to a plurality of columns, therefore, periodic moiré in the vertical direction, which is caused by the column output circuit and the output signal supply circuit for each column, can be suppressed, and image quality can be improved.

In the above mentioned aspect of the invention, it is preferable that the image processing circuit further comprises an offset adjustment section for adjusting the second offset according to the brightness of at least one frame of the image. This offset adjustment section adjusts such that the second offset is to be larger when the brightness is higher, and the second offset is to be smaller when the brightness is lower. By this, the generation of vertical moiré can be more effectively suppressed on a screen with high brightness.

In the above mentioned aspect of the present invention, it is preferable that the image processing circuit further comprises an offset generation section which compares the pixel signal for each column and the reference value corresponding to the brightness of at least one frame of the image, and dynamically generates the second offset. By this, the second offset, optimized for each image sensor, is generated, and the generation of the vertical moiré in the output image can be suppressed more appropriately.

To achieve the above object, the second aspect of the present invention is an image processing circuit for an image sensor, comprising a correction circuit for adding/subtracting offset, which is set according to a plurality of columns, to/from the pixel signals being output by amplifying the photoelectric conversion signals of pixels, which have photoelectric conversion elements and are arranged in column and row directions, for each column.

According to the above mentioned second aspect, offset, which is periodically generated depending on the supply route of the pixel signals, is corrected by the correction circuit, so vertical moiré, which appears in the output image, can be suppressed.

BRIEF DESCRIPTION OF THE DRAWINGS

FIG. 10 shows an operation example of the sensitivity correction circuit;

DESCRIPTION OF THE PREFERRED EMBODIMENTS

Embodiments of the present invention will now be described with reference to the accompanying drawings. The protective scope of the present invention, however, is not limited by the embodiments herein below, but encompasses the invention stated in the Claims and equivalents thereof. The present invention can be widely applied to image sensors, but the following embodiments will be described using a CMOS image sensor as an example.

Figure 1:
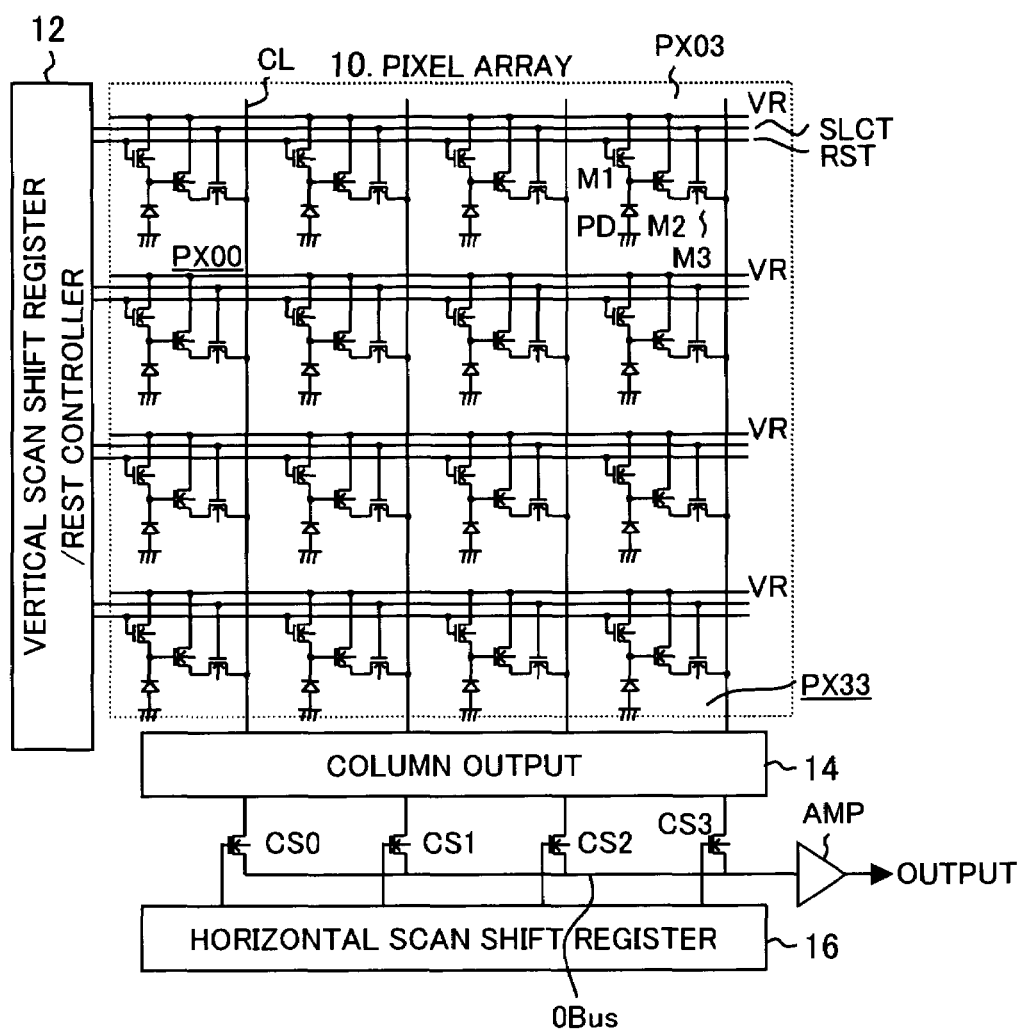
FIG. 1 is a diagram depicting a configuration of the pixel array of the CMOS image sensor according to the present embodiment.

FIG. 1 is a diagram depicting a configuration of the pixel array of the CMOS image sensor according to the present embodiment. The pixel array 10 comprises a plurality of reset power supply lines VR, row select lines SLCT, reset lines RST all of which are arranged in the row direction, a plurality of column lines CL which are arranged in the column direction, and pixels PX00-33 which are arranged at the intersecting positions of each column select line, reset line and column line. In each pixel, a photoelectric conversion circuit is disposed, which is comprised of a reset transistor M1, a photodiode PD that is a photoelectric conversion element, a source follower transistor M2 for amplifying the cathode potential of the photodiode, and a selecting transistor M3 for connecting the source of the source follower transistor M2 and the column line CL responding to the row select line SLCT, are disposed, as shown in the pixel PX03.

Driving of the row select lines SLCT arranged in the row direction and the reset lines RST is controlled by the vertical scan shift register and the reset control circuit 12. Each column line CL arranged in the column direction CL is connected to the column output circuit 14 respectively. The column output circuit 14, as mentioned later, amplifies the photoelectric conversion signals which are supplied from each pixel via the column line CL, deletes the reset noise generated along with the reset operation, and outputs the pixel signals.

The pixel signals, which are output from the column output circuit 14, are output to the common output bus OBus via the column select transistors CS0-3, which are selected by the horizontal scan shift register 16, and amplified by an amplifier AMP connected to the output bus. The output of the amplifier AMP is supplied to the later mentioned color processor.

Figure 2:
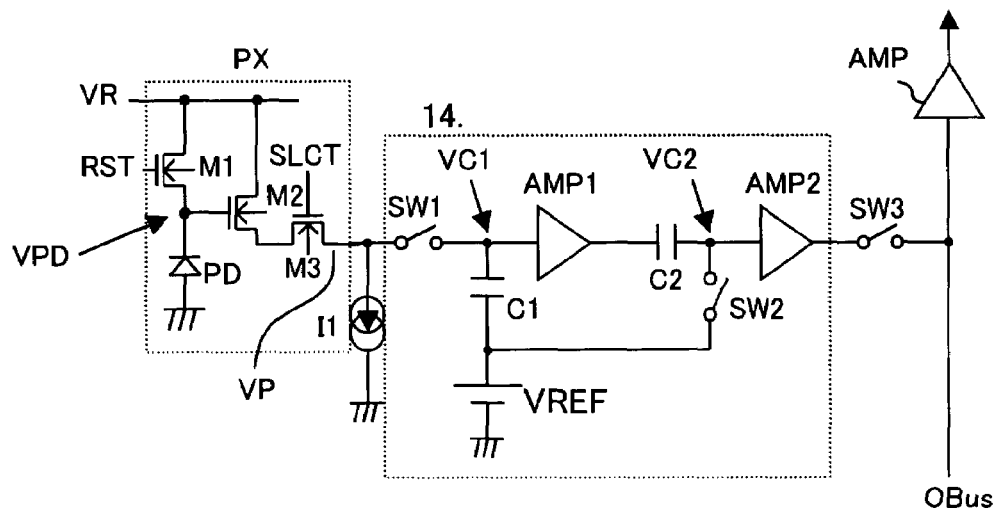
FIG. 2 is a diagram depicting an embodiment of the column output circuit.
Figure 3:
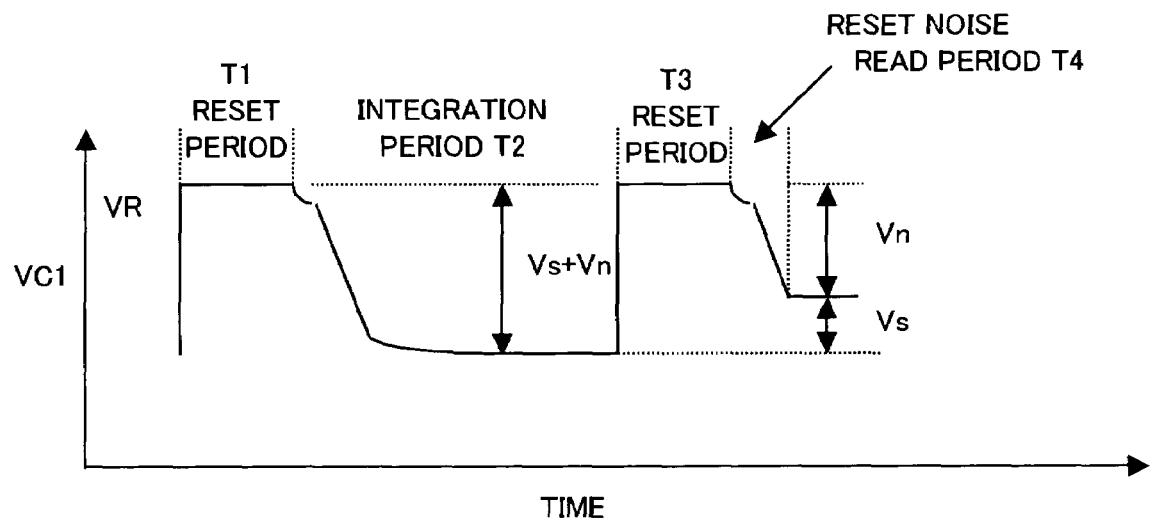
FIG. 3 is a signal waveform diagram depicting operation of the column output circuit.

FIG. 2 is a diagram depicting an embodiment of the column output circuit, and FIG. 3 is a signal waveform diagram depicting operation of the column output circuit. FIG. 2 shows the circuit of one pixel PX, and the column output circuit 14, which is connected thereto via a column line, which is not illustrated. The column output circuit 14 is a correlative double sampling circuit which is comprised of a first switch SW1, a second switch SW2, a first sample hold capacitor C1, a second sample hold capacitor C2, a reference voltage VREF, and a first and second amplifiers AMP1 and AMP2. The current supply I1 is disposed between the pixel PX and the column output circuit 14.

The pixel PX and operation of the column output circuit 14 will be described with reference to FIG. 3. To simplify description, it is assumed that the row select line SLCT is maintained at H level, and the selecting transistor M3 maintains ON status. In this status, in the reset period T1, the reset line RST becomes H level, the reset transistor M1 turns ON, and the cathode potential VPD of the photodiode PD is set to the reset level VR. When the reset line RST becomes L level and the reset transistor M1 is turned OFF, the cathode potential VPD gradually decreases its level by the current which the photodiode PD generates according to the intensity of the input light. This is the integration period T2.

After the predetermined integration period T2 has elapsed, the switches SW1 and SW2 are temporarily turned ON, and the drive current from the source follower transistor M2, which is generated according to the cathode potential VPD, recharges the capacitor C1 via the selecting transistor M3 and the column line, which is not illustrated. By this, the node VC1 becomes the level Vs+Vn, which is the sum of the potential Vn at reset and the potential Vs (negative potential) which dropped during the integration period. The potential of the node VC1 is also transferred to the second capacitor C2 via the first amplifier AMP1. At this time, the second switch SW2 is also in ON status, and if the amplification factor of the first amplifier AMP1 is 1, the second capacitor C2 is also charged to the same voltage status as the first capacitor. In the potential Vn at reset, reset noise generated along with the reset operation is included.

After the integration period T2 ends, the reset pulse is supplied again to the reset line RST, and the reset transistor M1 turns ON. By this, the cathode potential VPD is charged again to the reset level. Then after the reset noise read period T4 has elapsed, the first switch SW1 is temporarily turned ON, and the second switch SW2 is maintained in OFF status. In this reset noise read period T4 as well, the level of the cathode potential VPD decreases by the current of the photodiode according to the received light intensity, just like the integration period T2, but the reset noise read period T4 is set as shorter compared with the integration period T2. However, the integration period T2 is controlled to be an optimum period according to the brightness level of the input light, so the periods T2 and T4 cannot always be simply compared.

When this reset noise read period T4 has elapsed, the switch SW1 turns ON, and the node VC1 of the first capacitor C1 becomes the potential Vn according to the level after reset. This potential Vn is transferred to the terminal of the second capacitor C2 via the first amplifier AMP1. At this time, the second switch SW2 is in OFF status, so the node VC2 of the second capacitor C2 is in open status. Therefore a fluctuation of the differential voltage (VS+Vn)−Vn=Vs, between the potential Vs+Vn of the node VC1 at the end of the integration period T2 and the potential Vn of the node VC1 at the end of the reset noise read period T4, occurs at the node VC2 of the second capacitor C2, and the voltage VREF+Vs, which is the sum of the reference voltage VREF at the first sampling and the differential voltage Vs, is generated at the node VC2. The voltage Vn, including the reset noise, has been removed from this voltage VREF+Vs.

The third switch SW3 in FIG. 2 corresponds to the column gates CS0-3 in FIG. 1, and the above mentioned voltage (VREF+Vs) of the node VC2 is amplified by the second amplifier AMP2, and is output to the output bus OBus via the column gate SW3, which is controlled ON/OFF by the horizontal scan shift register 16. And this output is amplified by the common amplifier AMP which is disposed in the output bus OBus, and is supplied to the A/D conversion circuit in a subsequent stage as pixel signals.

Figure 4:
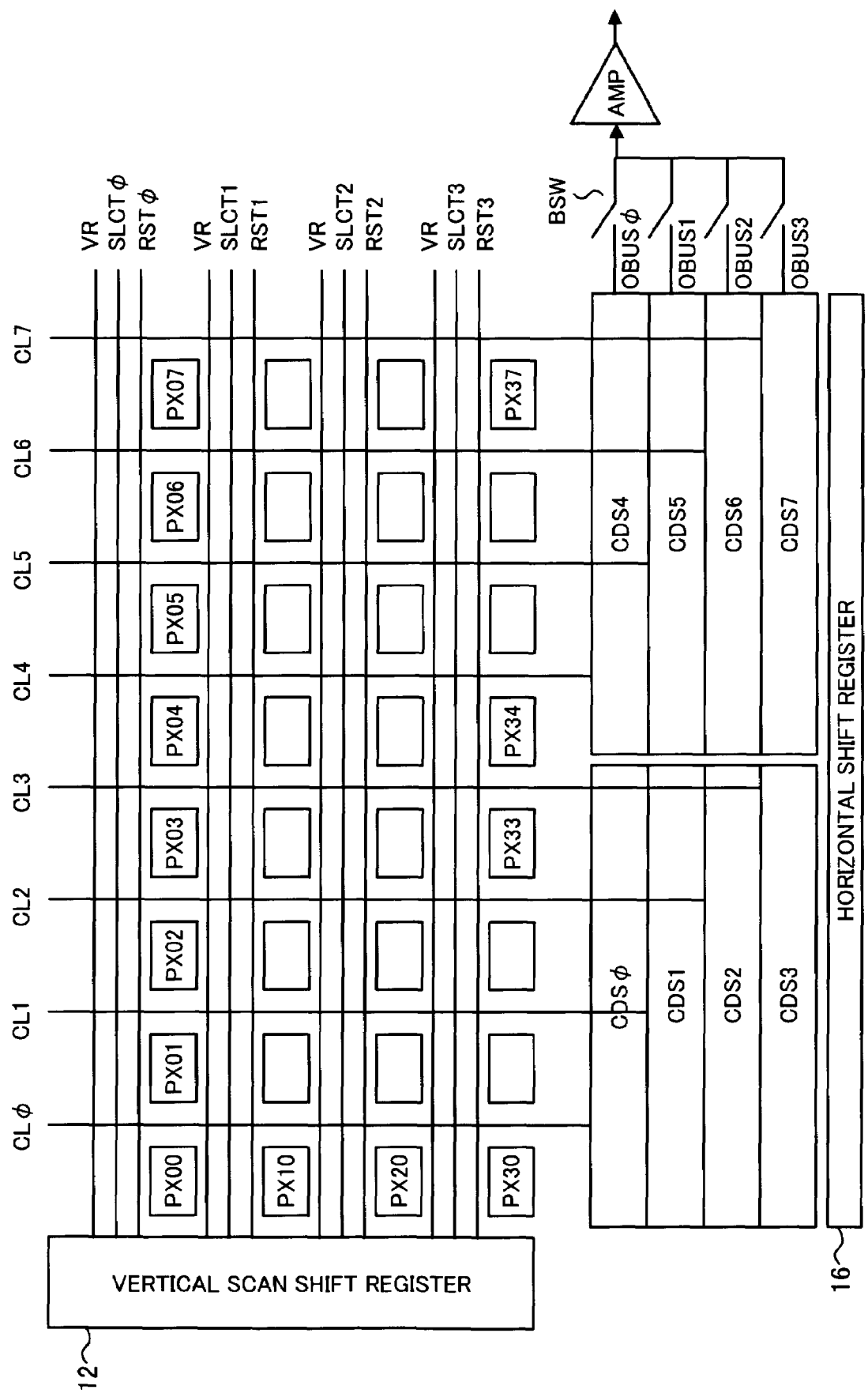
FIG. 4 is a diagram depicting an example of the layout of the image sensor.

FIG. 4 is a diagram depicting a layout example of the image sensor. Just like FIG. 1, the pixel array is comprised of pixels PX00-37 having photoelectric conversion elements arranged in column and row directions, wherein the reset power supply line VR, row select lines SLCT0-3 and reset lines RST0-3 are disposed in the row direction, which are controlled by the vertical scan shift register, which also functions as the reset control circuit 12, respectively. In the row direction, column lines CL0-7 are disposed, and the column output circuits (correlative double sampling circuits) CDS0-7 are disposed in each column line CL0-7. It is difficult to arrange these column output circuits matching with the column line pitch, so a column output circuit has a width matching with a pitch of four column lines, and four column output circuits CDS0-3 or CDS4-7 are arranged in the column direction.

According to such an array of column output circuits, four output buses OBUS0-3 are connected to a common amplifier AMP via the bus switch BSW respectively. Therefore the photoelectric conversion signals of the pixels PX00-30, connected to the column line CL0, are detected by the column output circuit CDS0, and the pixel signals thereof are supplied to the amplifier AMP via the output bus OBUS0 and the bus switch BSW. In the same way, the photoelectric conversion signals of the pixels PX04-34, connected to the column line CL4, are also supplied to the amplifier AMP via the column output circuit CDS4, output bus OBUS 0 and bus switch BSW. This is the first pixel signal output path.

Also the photoelectric conversion signals of the pixels connected to the columns CL1 and CL5 are supplied to the amplifier AMP via the column output circuits CDS1, CDS5 and the output bus OBUS1. This is the second pixel signal output path. In the same way, signals of the pixels connected to the columns CL2 and CL6 are supplied to the amplifier AMP via the third pixel signal output path, and the signals of the pixels connected to the columns CL3 and CL7 are supplied to the amplifier AMP via the fourth pixel signal output path.

In the case of the layout example in FIG. 4, a predetermined offset is generated to the pixel signals for each column according to the circuit characteristics and the wiring characteristics of the four pixel signal output paths, even if the color of the image is uniform, and periodic vertical moiré or moiré in the column direction is generated. To suppress the generation of such moiré, a correction to suppress the layout regularity is necessary, which causes an increase in design man-hours.

Figure 5:
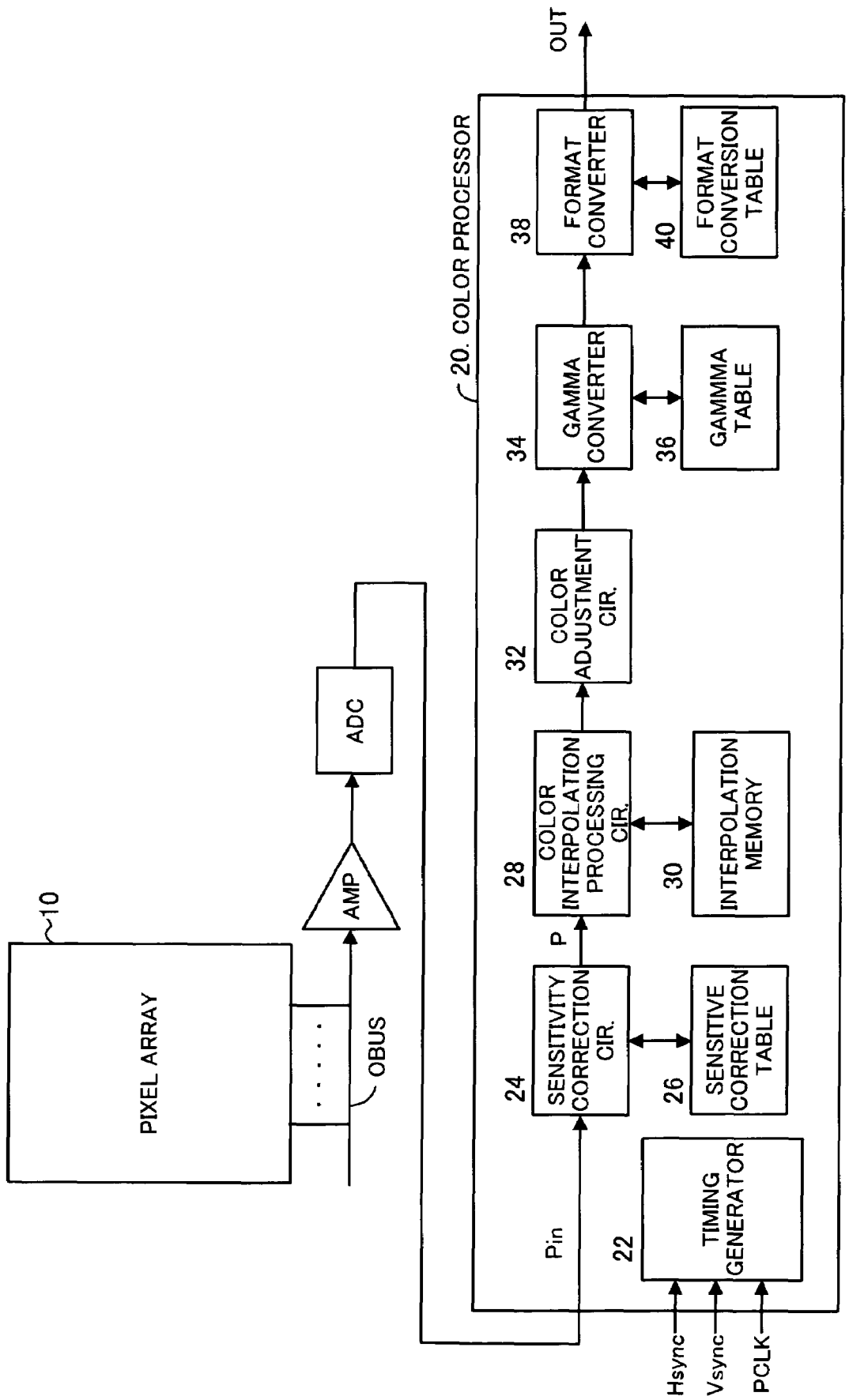
FIG. 5 is a diagram depicting a configuration of the color processor of the image sensor according to the present embodiment.

FIG. 5 is a diagram depicting the configuration of the color processor (image processing circuit) of the image sensor according to the present embodiment. The photoelectric conversion signals detected in the pixel array 10 are supplied to the color processor 20 as pixels signals Pin via the output bus OBUS, amplifier AMP, and A/D conversion circuit ADC. When the RGB color filter is disposed on the pixel array 10, the pixel signals Pin become signals with each color of RGB.

The color processor 20 comprises a timing generation circuit 22, which generates various timing signals from the horizontal synchronization signal Hsync used for driving of the pixel array 10, vertical synchronization signals Vsync and pixel clock PCLK. Also the color processor 20 further comprises a sensitivity correction circuit 24 for correcting characteristics which depend on the sensitivity of the color of the pixel signals Pin, a color interpolation processing circuit 28 which determines the gradation value of a color, other than the colors detected for each pixel, by the interpolation operation from the pixel signals of the surrounding pixels, a color adjustment circuit 32 for adjusting tone (e.g. blueness of blue), and a gamma conversion circuit 34 for matching the output data to the device characteristics (gamma characteristics) of the image output device, such as an LCD and CRT. And finally a format conversion circuit 38, for converting the format of image signals in a format appropriate for the display device, converts pixel signals into the format of the digital component, such as NTSC, YUV and YCbCr, then the image data is output.

To correct characteristics which depend on the sensitivity of a color, the sensitivity correction circuit 24 refers to the sensitivity correction table 26, which is created corresponding to each color, and performs the correction operation.

Figures 6, 7:
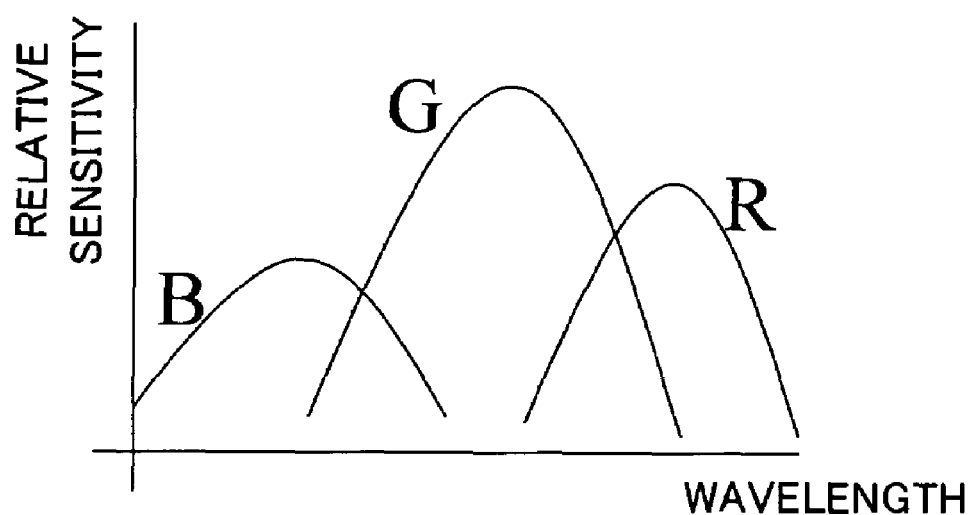
FIG. 6 is a diagram depicting an example of the color filter.
FIG. 7 is a diagram depicting sensitivity correction.

FIG. 6 is a diagram depicting an example of the color filter, and FIG. 7 and FIG. 8 are diagrams depicting sensitivity correction. The color filter shown in FIG. 6 is one called a Bayer array, where red (R) and green (G) are alternately arranged for odd rows, and blue (B) and green (G) are alternately arranged for even rows, because high sensitivity is provided to viewers by outputting more detected signals of green (G), which is the most sensitive to human eyes. In other words, in this color filter, green (G) is arranged in a checkered pattern, and red (R) and blue (B) are arranged in the other checkered pattern. By disposing this color filter, pixel signals corresponding to the gradation value (brightness) of each color are output from the pixel array.

FIG. 7 is a diagram depicting the relationship between the wavelength and relative sensitivity. RGB corresponds to the sequence of large, medium and small wavelengths, and each sensitivity is determined by the sensor sensitivity of the pixel and color filter characteristics, and depends on the device. As FIG. 7 shows, green (G) has the highest sensitivity, and sensitivity decreases in the sequence of red (R) and blue (B).

Figure 8A:
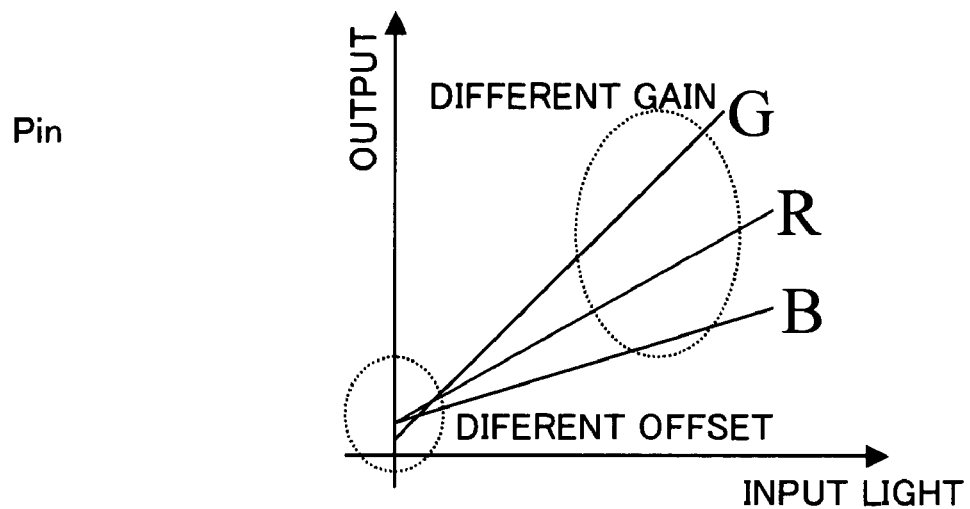
FIG. 8 is a diagram depicting sensitivity correction.
Figure 8B:
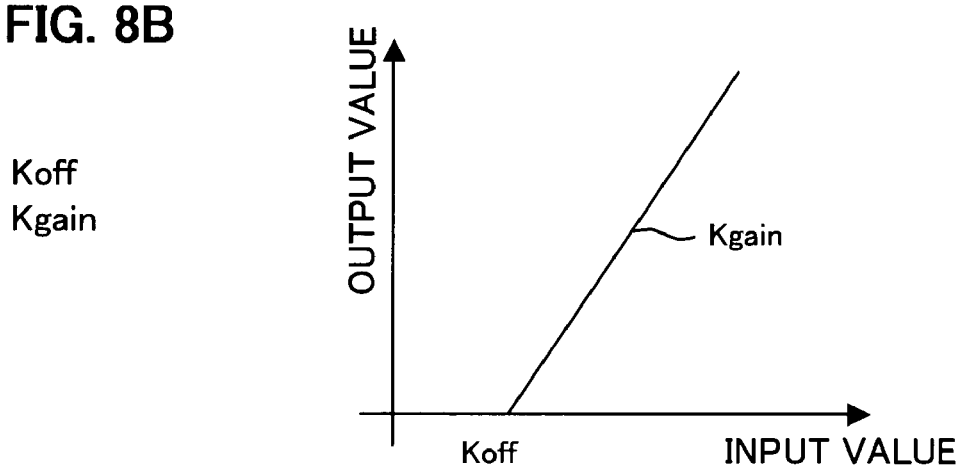

FIG. 8A is a diagram depicting the relationship between the light intensity of input light to the pixel array and the pixel signal Pin, which is the output value when the input light is photoelectric converted, amplified by the column output circuit, and A/D converted. As FIG. 7 shows, according to the difference of the relative sensitivity depending on RGB, the relationship of the output value to the input light has a different gain in the sequence of GRB, and RGB has different offset values respectively. Therefore, to make the input light and output value (pixel signal Pin) have the same characteristics for R, G and B by performing sensitivity correction for the pixel signals Pin with different offset and gain, the pixel signal Pin is corrected using the predetermined offset Koff and gain Kgain shown in FIG. 8B.

Figure 8C:
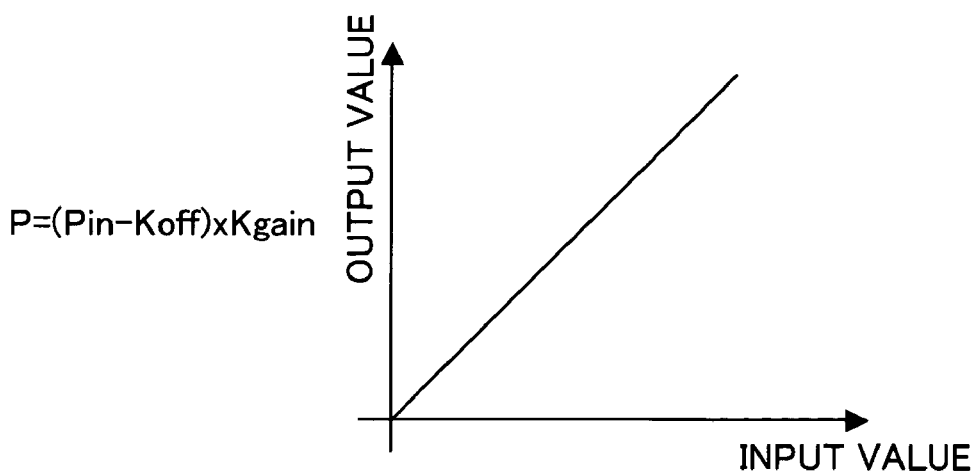

In other words, the offset Koff of each color, which is set for each color, is added to or subtracted from the pixel signals Pin of RGB which have the characteristic shifts shown in FIG. 8A, and is multiplied or divided by the gain Kgain of each color which is set (hereafter multiplication is used to simplify description), so that pixel signals P with the consistent characteristics shown in FIG. 8C can be obtained. In other words, the operation of $P=(Pin-Koff) \times Kgain$ is performed by the sensitivity correction circuit 24. The above mentioned offset Koff and gain Kgain are set for each color, and are stored in the sensitivity correction table 26. In the case of the color filter with a Bayer array in FIG. 6, the red (R) and green (Gr) in the odd rows and blue (B) and green (Gb) in the even rows have a different sensitivity, so corresponding to this, four types of offset Koff and gain Kgain for correction have been stored in the sensitivity correction table 26 in advance.

If the color filter is comprised of CMYK, which is a color space of the complementary colors of RGB, sensitivity differs for CMYK respectively, so the offset and gain for each CMYK are set in the sensitivity correction table 26 accordingly.

In FIG. 5, the color interpolation processing circuit 28 generates RGB pixel signals for each pixel. In the case of the color filter shown in FIG. 6, pixel signals for green (G) and blue (B) cannot be received for the pixels corresponding to red (R). Therefore the color interpolation processing circuit 28 interpolates the signals of the surrounding pixels, so that the pixel signals for green (G) and blue (B) can be generated for the pixels of the color filter of red (R). For this, the pixel signals of the surrounding pixels are temporarily recorded in the interpolation memory 30. And the color interpolation processing circuit 28 performs the interpolation operation for the pixel signals of the surrounding pixels which are temporarily recorded in the memory for interpolation 30.

The conversion table for converting into the gamma characteristics of the image output device, such as a CRT and LCD, is stored in the gamma table 36. The format conversion table 40 is a table for converting the output data into the display signal format, such as NTSC and YUV.

As described in FIG. 4, in the image signals which are output from the pixel section, a predetermined characteristic is superimposed for each column because of the restrictions in layout, and it has been confirmed that periodic vertical moiré are generated when an image with a uniform color is captured. So in the present embodiment, operation for suppressing this periodic vertical moiré is performed by the sensitivity correction circuit 24 in the color processor 20. Specifically, offset for sensitivity correction is added to the sensitivity correction table 26 to create offset for suppressing periodic vertical moiré, and the generation of vertical moiré caused by the restrictions of layout is suppressed.

Figure 9:
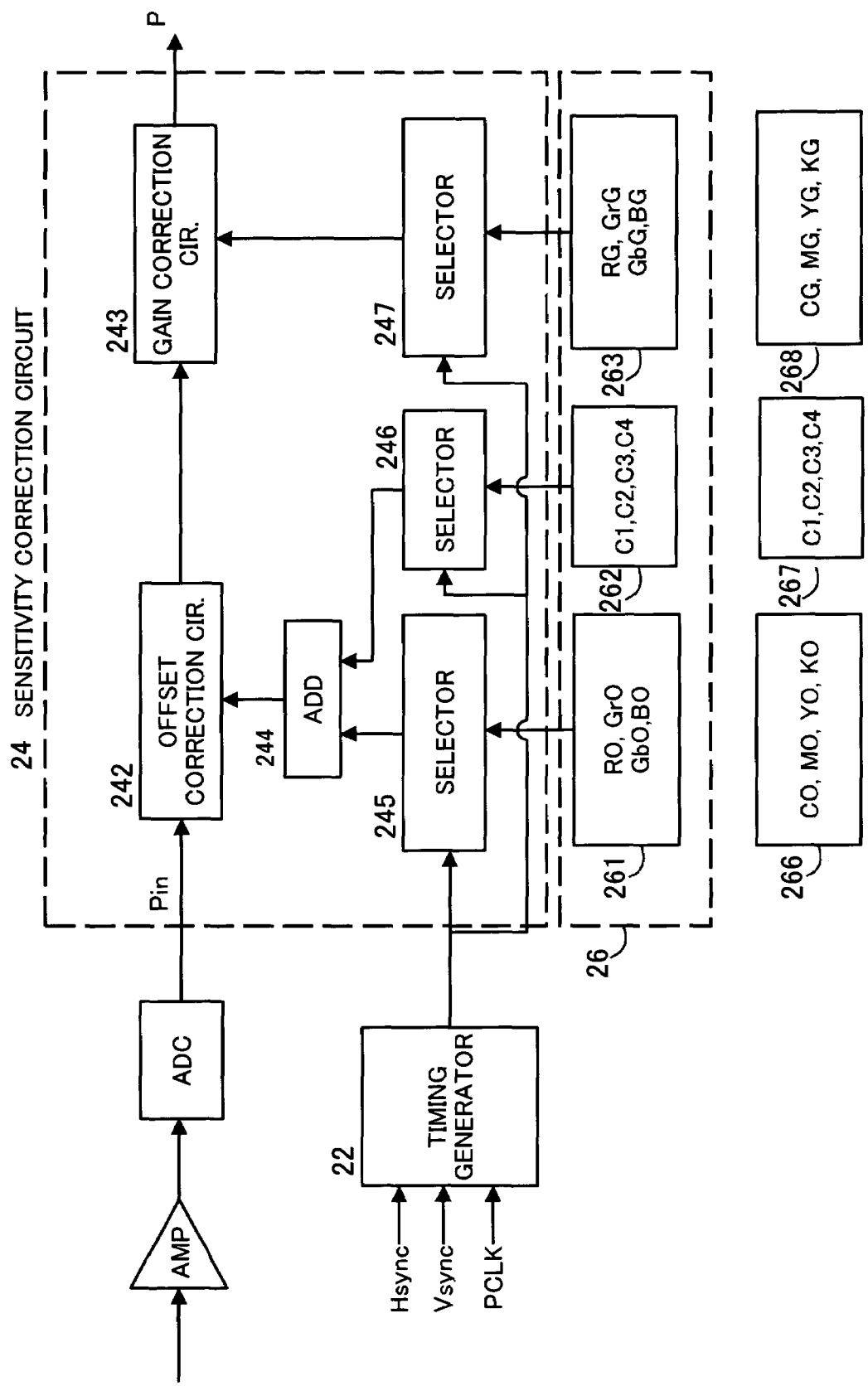
FIG. 9 is a diagram depicting the sensitivity correction circuit according to the present embodiment.

FIG. 9 is a diagram depicting the sensitivity correction circuit according to the present embodiment. As described in FIG. 8, the offset correction circuit 242 and the gain correction circuit 243 are disposed in the sensitivity correction circuit 24, offset which is different for each color, R, Gr, B and Gb is added to/subtracted from the pixel signals Pin, and a gain which is different for each color is multiplied in the gain correction circuit 243. Along with this, a first offset table 261, having offsets RO, GrO, GbO and BO and a gain table 263 having gain RG, GrG, GbG and BG, which are different for each color R, Gr, Gb and B, are provided in the sensitivity correction table 26.

To suppress vertical moiré which appear periodically, the sensitivity correction table 26 has a second offset table 262 having offsets C1, C2, C3 and C4, which are different for each one of the four columns having periodicity. The set values of the offset tables 261, 262 and the gain table 263 are selected by the selectors 245, 246 and 247 respectively according to the timing signal generated by the timing generation circuit 22, and are output to the correction circuits 242 and 243. The offset values of the first offset table 261 and the offset values of the second offset table 262 are added (or subtracted) by the addition circuit 244, and are supplied to the offset correction circuit 242.

In this way, according to the present embodiment, the offset correction circuit 242 is disposed in the sensitivity correction circuit 24, so vertical moiré which appears periodically is suppressed using the operation function thereof. For this, the offset values C1, C2, C3 and C4, depending on the difference of characteristics of each column, are set and stored in the sensitivity correction table 26 in advance. In the case of the circuit layout example in FIG. 4, a vertical moiré is generated at each four columns, so four types, C1-C4, of offset values to suppress the vertical moiré are set.

FIG. 9 shows the sensitivity correction tables 266, 267 and 268 when the color filter is CMYK. In this case, the offset table for sensitivity correction 266, offset table for vertical moiré correction 267 and gain table for sensitivity correction 268 are stored rather than the tables 261, 262 and 263.

FIG. 10 shows an operation example of the sensitivity correction circuit. FIG. 10A is an example of pixel signals Pin, which are output from four row by four column pixel signal when an image with a uniform color is captured, in the case of a Bayer arrayed RGB color filter. In other words, the pixel signals R11, G12, T13 and G14 are output for the pixel signals Pin for the first row, and the pixel signals G21, B22, G23 and B24 are output for the pixel signals Pin for the second row. This is the same for the third row and fourth row. In this example, concerning the pixel signals of green (G), the second column is +1, the third column is +2, and the fourth column is −1 compared with "60" in the first column.

FIG. 10B shows the set values of the offset values and gains. The offset value for each column is set as C1=0, C2=1, C3=2 and C4=−1 considering the above mentioned tendency. The offsets RO, GO and BO for each color and the gains RG, GG and BG for each color are set as FIG. 10(B) shows. In this example, the green (Gr) in odd rows and green (Gb) in even rows are not differentiated.

FIG. 10C shows the computing equations of the sensitivity correction circuit for the columns 1-4 in the first and second rows. The sum of the offset for each column and the offset for each color is subtracted from the pixel signal Pin and is multiplied by the gain for each color, and the correction values R11m-G14m and G21m-B24m of each pixel are determined. The pixel signals after correction determined in this way are all "60", as shown in FIG. 10D.

Figure 11:
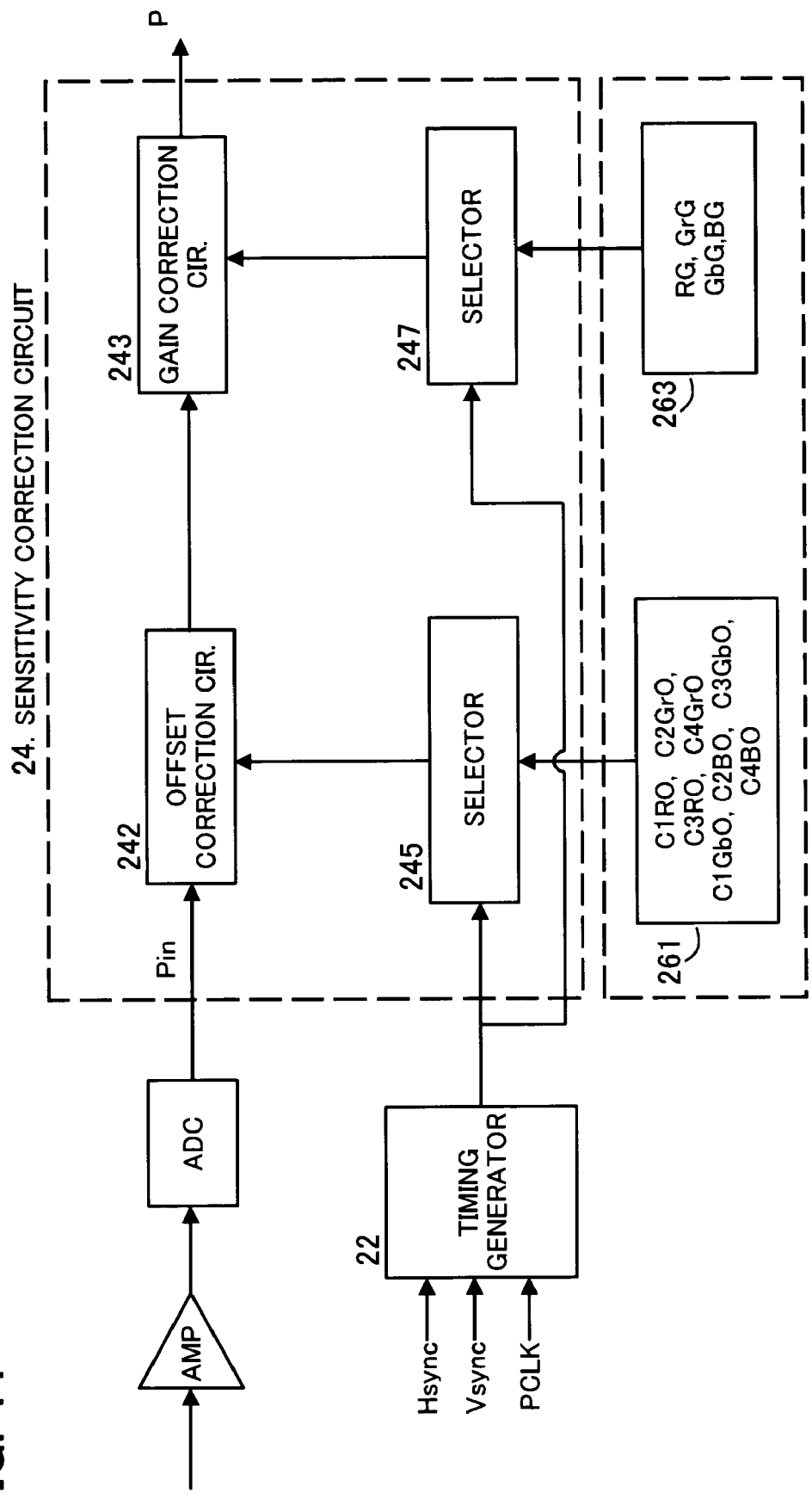
FIG. 11 is a diagram depicting a variant form of the sensitivity correction circuit in FIG. 9.

FIG. 11 is a diagram depicting a variant form of the sensitivity correction circuit in FIG. 9. In the case of the example in FIG. 9, the offset table 261 for each color and the offset table 262 for each column are created independently, and are added by the addition circuit 244. While in the example in FIG. 11, the offsets C1RO, C2GrO, C3RO, C4GrO, C1GbO, C2BO, C3Gb, and C4BO, which are the sums of the offset for each color and offset for each column are added, are determined in advance, and are stored in an integrated offset table 261. Therefore only one selector for offset 245 is provided, where the addition circuit 244 is unnecessary. The gain table 263 is the same as the example in FIG. 9.

Figure 12:
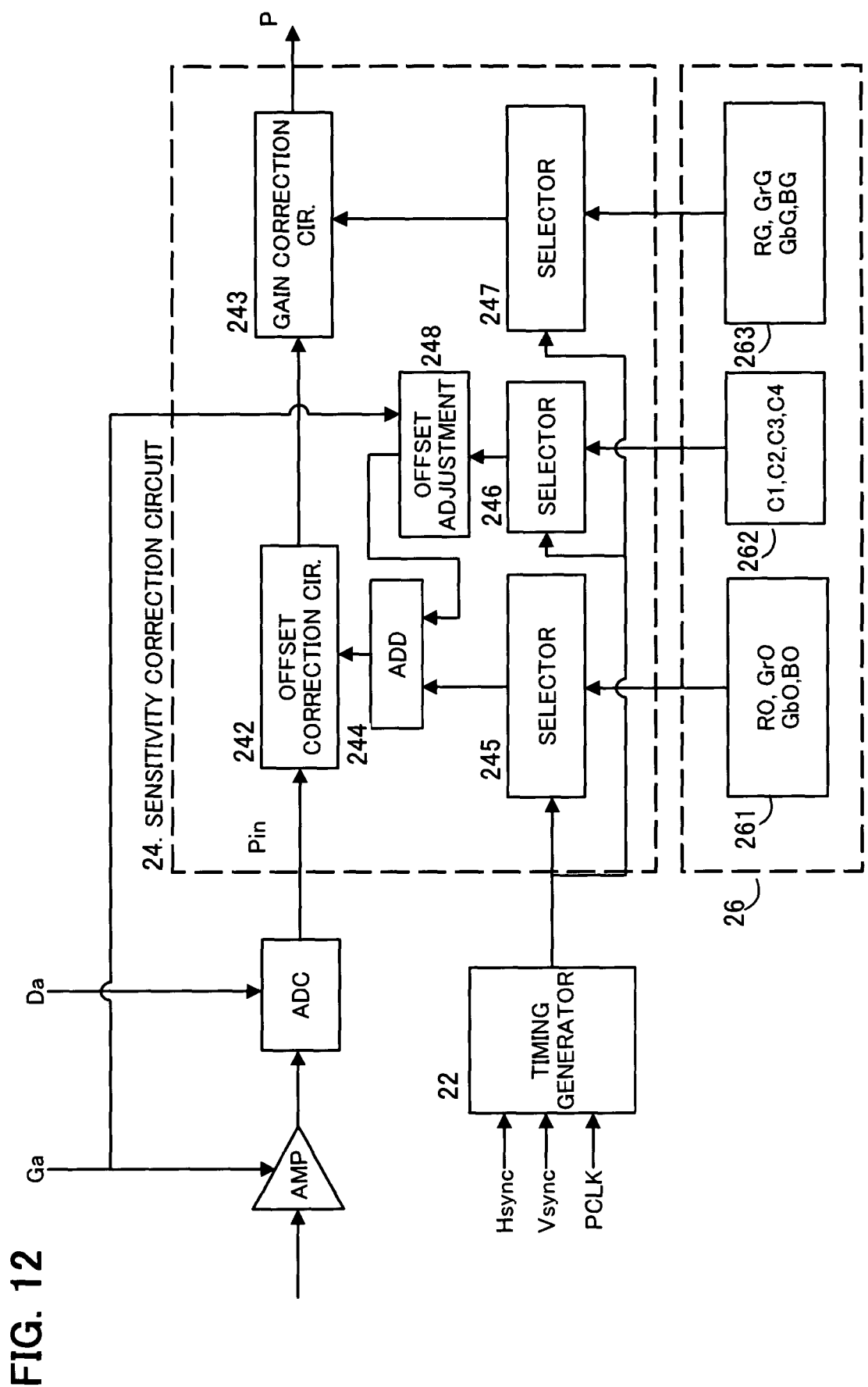
FIG. 12 is a diagram depicting the sensitivity correction circuit according to the second embodiment.

FIG. 12 is a diagram depicting the sensitivity correction circuit according to the second embodiment. In this example, there is the offset adjustment circuit 248 for adjusting the offsets C1-C4 for each column according to the gain control signal Ga of the amplifier AMP, to indicate the brightness of the image to be captured. The other configuration is the same as FIG. 9. The image sensor automatically controls the length of the integration period in the pixel array according to the brightness of the image. In the case of a bright image, the image sensor controls the integration time to be short so that the photoelectric conversion signals do not saturate, and in the case of a dark image, the image sensor controls the integration time to be long so that the photoelectric conversion signals become a sufficient level. Therefore the image sensor generates some control signals while detecting the brightness of an image. One of the control signals is the gain control signal Ga of the amplifier AMP. Another is the dynamic range control signal Da of the A/D conversion circuit ADC. In the case of a bright image, the gain of the amplifier AMP is controlled to be low, and the dynamic range of the A/D conversion circuit is controlled to be wide. In the case of a dark image, the gain of the amplifier AMP is controlled to be high, and the dynamic range of the A/D conversion circuit is controlled to be narrow.

By providing control signals which depend on the brightness of an image, such as a gain control signal Ga, to the offset adjustment circuit 248 like this, the offset value for each column is adjusted. In other words, in the case of a bright image, offset for each column tends to be more critical or emphasized, so the offset value is adjusted considerably or in larger. And in the case of a dark image, the offset for each column is not so critical, so the offset value is adjusted little. By this, an optimum offset for each column according to the brightness of an image can be provided to the offset correction circuit 242. The offset adjustment circuit 248 may adjust offset for each column based on the dynamic range control signal Da of the A/D conversion circuit.

Figure 13:
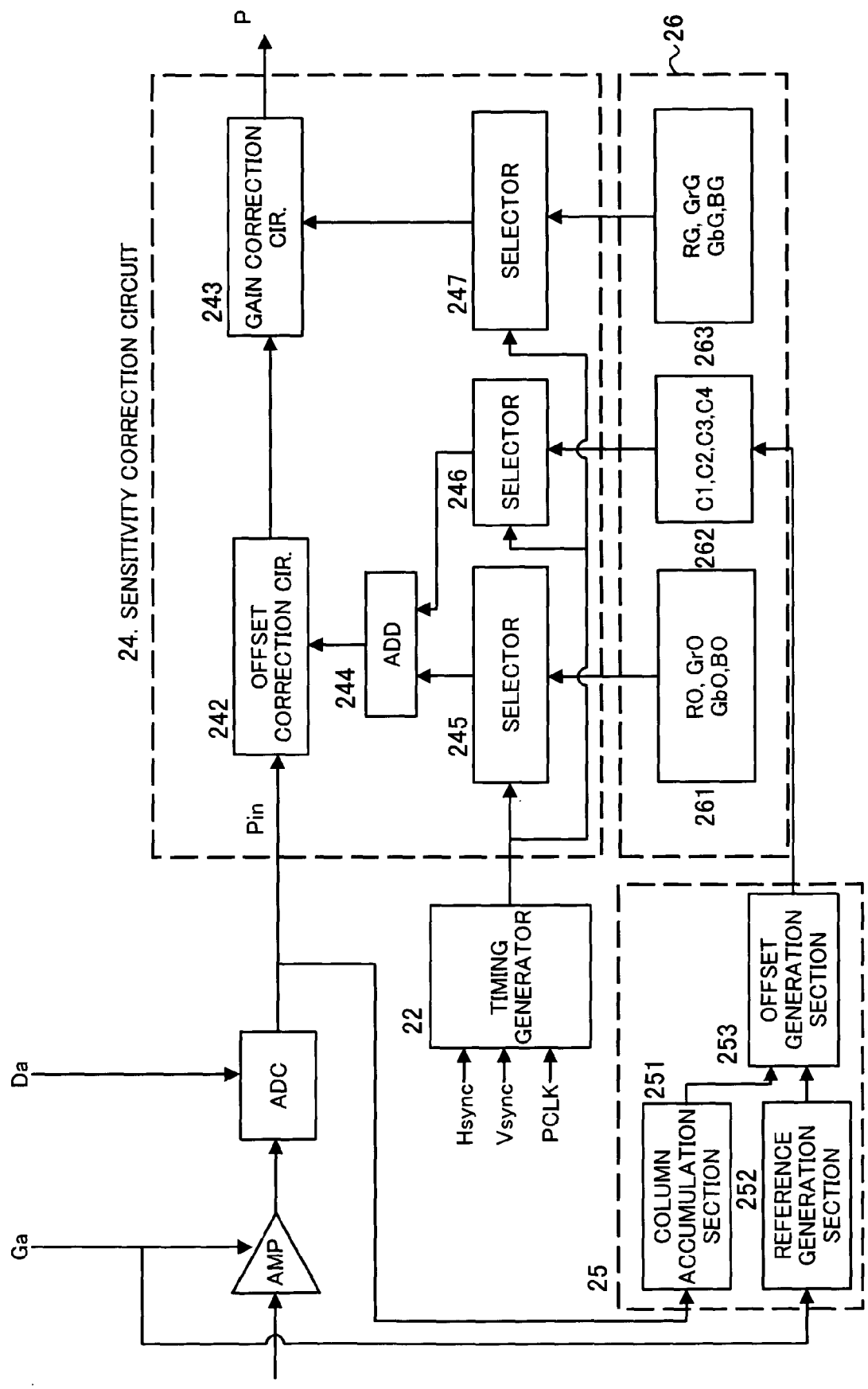
FIG. 13 is a diagram depicting the sensitivity correction circuit according to the third embodiment.

FIG. 13 is a diagram depicting a sensitivity correction circuit according to the third embodiment. In this example, the image sensor has the offset setting circuit 25 in addition to the sensitivity correction circuit 24 and the sensitivity correction table 26, the same as FIG. 9. This offset setting circuit 25 generates an optimum offset from the average brightness level of one frame of an image and from the level of the image signal Pin for each column, and sets the generated offset in the offset table for each column 262, when the power of the image sensor is turned ON, for example. Specifically, the generated offset for each column C1-C4 is stored in the offset table 262.

The average brightness level of one frame of an image is generated by the reference value generation section 252 based on the gain control signal Ga of the amplifier AMP, for example. The level of the image signal for each column is generated by the column accumulation section 251 which accumulates the level of the image signals Pin for each column. And the difference between the reference value and the cumulative value for each column is determined by the offset generation section 253, and an optimum offset for each column C1-C4 is generated.

In this way, providing the offset setting circuit 25 makes it unnecessary to set the offset for each column in the table 262 in advance at a factory before shipment. And the offset for each column C1-C2 is generated considering dispersion depending on the device, dispersion depending on the manufacturing lot, and dispersion due to the aged deterioration of the device, and the optimum offsets are set in the table. Therefore separate settings are unnecessary and an optimum offset for each column is set, and image quality improves.

Figure 14:
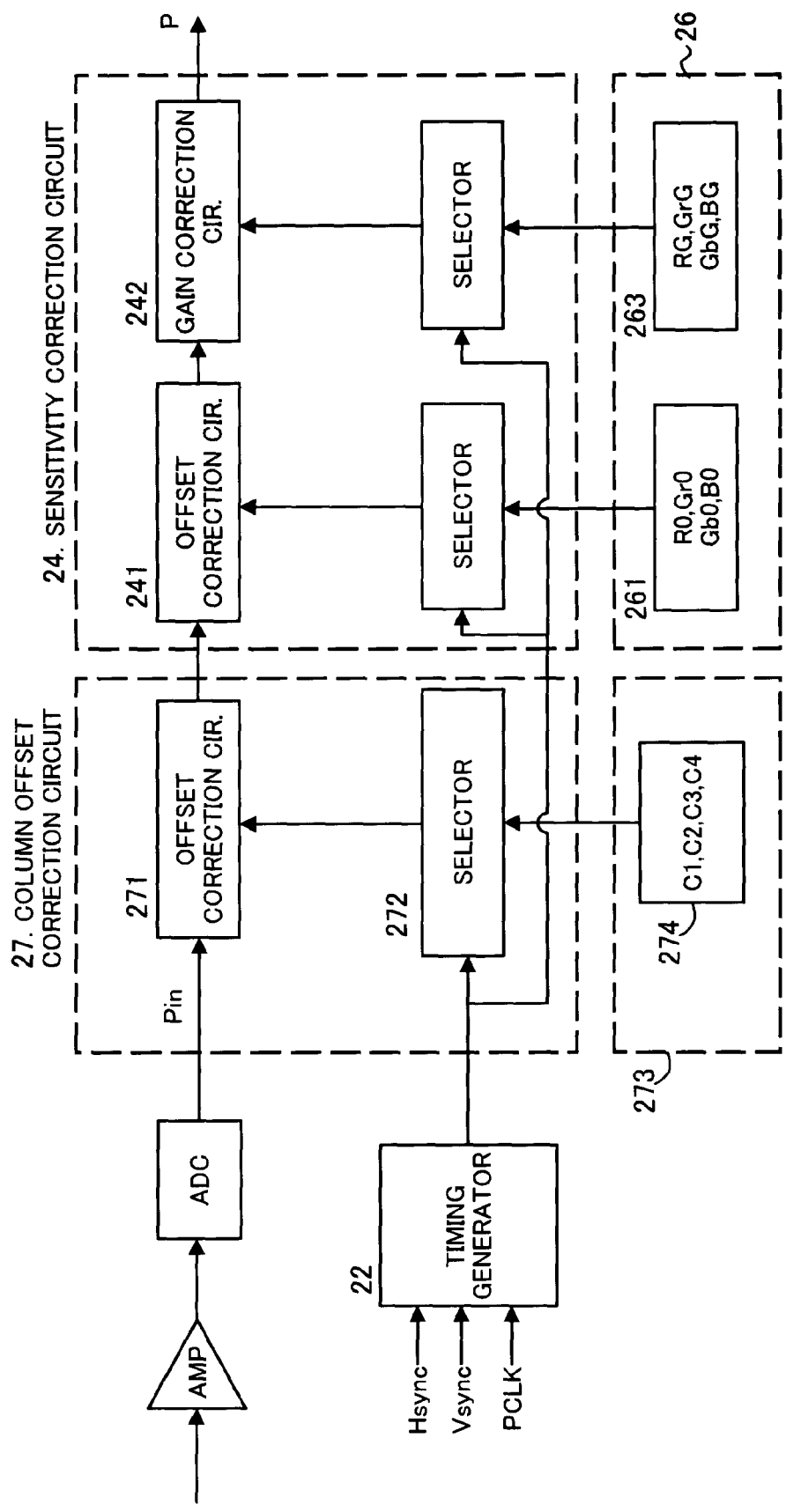
FIG. 14 is a diagram depicting the correction circuit according to the fourth embodiment.

FIG. 14 is a diagram depicting the correction circuit according to the fourth embodiment. In this example, the column offset correction circuit 27, for correcting the offset for each column, is disposed separately from the color sensitivity correction circuit 24. In this example, the column offset correction circuit 27 and offset table for each column 274 are disposed, and the offset for each column C1-C4, corresponding to the pixel, is selected by the selector 272, which is added to/subtracted from the pixel signal Pin in the offset correction circuit 271. Then sensitivity correction is performed by the above mentioned sensitivity correction circuit 24.

According to the present invention, vertical moiré which appear periodically in the output image of the image sensor can be suppressed and image quality can be improved.

What is claimed is:

1. An image processing circuit, comprising:
a color sensitivity correction circuit which adds or subtracts a predetermined offset to or from a pixel signal obtained, for each column, by amplifying photoelectric conversion signals of pixels, and multiplies a result of the addition or subtraction by a predetermined gain, said pixels having a photoelectric conversion element respectively and being arranged in column and row directions,
wherein said predetermined offset includes a first offset, which is set according to each color, and a second offset, which is set according to a plurality of columns, and
wherein said color sensitivity correction circuit comprises an offset generation section, which compares pixel signals for each column with a reference value corresponding to brightness of at least one frame of an image, dynamically generates the second offset according to the result of the comparison, and updates the dynamically generated second offset as the second offset, wherein said reference value is determined based on a gain of an amplifier for amplifying said pixel signals corresponding to at least one frame of an image.

2. The image processing circuit according to claim 1, wherein said color sensitivity correction circuit further comprises a first offset table where said first offset is stored, and a second offset table where said second offset is stored, and the first and second offsets which are output from said first and second offset tables are added to or subtracted from said pixel signals.

3. The image processing circuit, comprising:
a correction circuit for or adding or subtracting an offset for each column, which is set according to a plurality of columns, to or from pixel signals obtained for each column by amplifying photoelectric conversion signals of pixels, said pixels having photoelectric conversion elements and being arranged in column and row directions,
wherein said correction circuit further comprises an offset generation section which compares the pixel signals for each column with a reference value corresponding to brightness of at least one frame of an image, generates said offset for each column dynamically according to the result of the comparison, and updates the dynamically generated offset for each column as the offset for each column, wherein said reference value is determined based on a gain of an amplifier for amplifying said pixel signals corresponding to at least one frame of an image.

4. The image processing circuit according to claim 3, wherein said correction circuit adds or subtracts an offset for each color, which is set for each color, to or from said pixel signals, and multiplies a result of the addition or subtraction by a gain which is set for each color.

5. The image processing circuit according to claim 3, wherein said correction circuit further comprises an offset table for storing the offset for each column, and said correction circuit adds or subtracts the offset for each column which is output from said offset table to or from said pixel signals and stores the dynamically generated offset in said offset table for said updating.

6. A color image sensor, comprising: the image processing circuit according to any one of claims 2 and 3-5;
a pixel array where said pixels are arranged in column and row directions; and
a column output circuit which is disposed for each column, amplifies the photoelectric conversion signals of said pixels arranged in the column direction; and outputs said pixel signals.

* * * * *